Jan. 19, 1926.  
O. H. JOHNSON  
HARROW  
Filed June 1, 1925

1,570,154

Inventor  
Olof H. Johnson.  
By Geo. Stevens.  
Attorney

Patented Jan. 19, 1926.

1,570,154

UNITED STATES PATENT OFFICE.

OLOF H. JOHNSON, OF DULUTH, MINNESOTA.

HARROW.

Application filed June 1, 1925. Serial No. 33,885.

*To all whom it may concern:*

Be it known that I, OLOF H. JOHNSON, a subject of the King of Sweden, residing at Duluth, in the county of St. Louis and State of Minnesota, have invented certain new and useful Improvements in Harrows, of which the following is a specification, reference being had therein to the accompanying drawing.

This invention relates to harrows and has special reference to a sulky or riding harrow carrying a plurality of horizontally disposed shafts carrying rotary knives or discs.

The principal object of the invention is to provide simple means for transportation of the harrow when the cultivating elements are in inactive position.

Other objects and advantages will appear in the further description of the invention.

Referring now to the accompanying drawing, forming part of this application, and in which like reference characters indicate like parts:

1 represents an oblong rectangularly shaped supporting frame preferably made of angle iron in which is mounted a plurality of rotatable shafts, and in the embodiment here shown there are illustrated two pairs of such shafts, one upon either side of the centermost beam 2, one end of each pair being journalled on said beam and the opposite ends on the respective ends of the frame 1. In this instance I have shown the pairs of shafts as being staggered, that is to say two on one side being nearer the front of the frame than those on the opposite side, for convenience of access to the cultivating elements when the same are adjusted to or from the shafts and it is evident that this arrangement may be varied without departing from the spirit of the invention.

Figure 1:
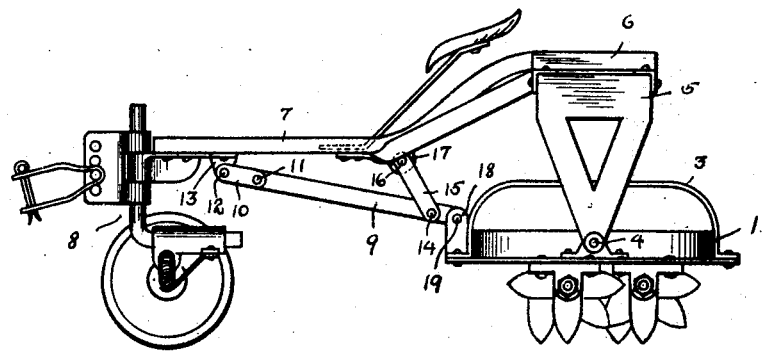
Figure 1 is a side elevation of a sulky harrow embodying my invention and showing the soil engaging elements in active position.
Figure 2:
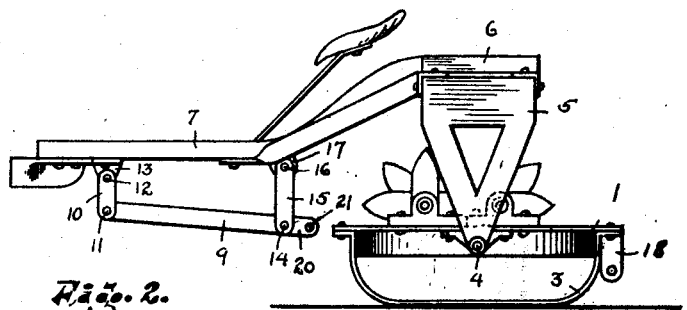
Figure 2 is a somewhat similar view showing the position of the device as it would appear ready for transpotration on the ground when not in use as a harrow.
Figure 3:
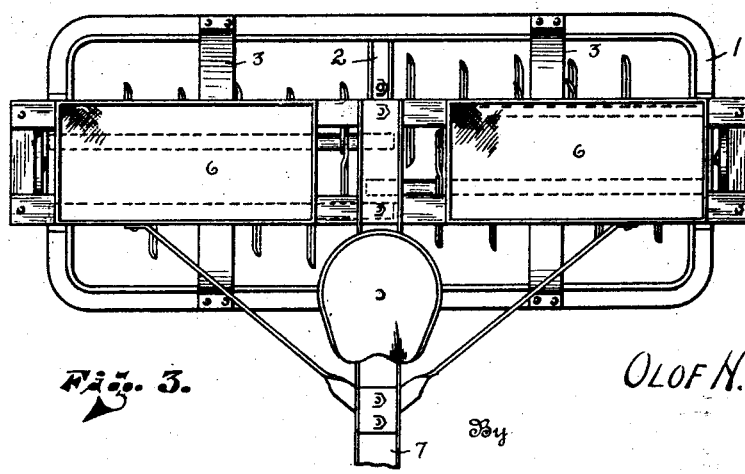
Figure 3 is a plan view of the ground engaging portion of the harrow and the superstructure above the same.

Upon the frame 1 are mounted two upwardly arched shoes 3 they being spaced equi-distant from the ends of the frame 1 and the office of which are to act as runners for support of the harrow when the frame 1 is turned upside down as shown in Figure 2. These runners may be fastened in any desired manner to the frame and I have shown them as having their ends bent to fit into the angle of the frame 1 and securely riveted thereto.

Pivotally supported as at 4 upon the two ends of the frame 1 is the rearmost portion 5 of the chassis of the harrow, the same being flat on top and carrying two stone trays 6 as is customary in such devices, and the reach 7 of the chassis extends forwardly from the upper portion of the superstructure 5 and downwardly to the sulky 8 where it is pivotally attached in any desired manner common to such harrows.

Beneath the reach 7 is an auxiliary reach or bar comprising the major portion 9 and minor portion 10 which is pivotally connected to the major portion as at 11, while its opposite end is pivotally connected as at 12 to a depending lug 13 from the under side of the reach; the opposite end of the major portion 9 of the bar being pivotally supported as at 14 by the depending bar 15, pivotally mounted as at 16 in the depending lug 17 under the reach 7.

In the center of the frame 1 and upon the forward edge thereof when in cultivating position is mounted an upright chair or bracket 18 carrying a horizontally fixed pin 19 upon which the innermost end 20 of the major portion 9 of the bar may be slipped, it having a hole 21 therein for such engagement, and this bar being suspended as it is is susceptible of lateral swing sufficient for such engagement. This auxiliary reach or bar is for the express purpose of keeping the frame in proper position when cultivating so that it cannot unduly rock or turn over during such process.

However when the harrow is to be moved without cultivating all that is necessary is to disconnect the auxiliary reach from the forward edge of the frame 1 and by slightly lifting on the rearmost edge of the frame during the advancement of the harrow the frame 1 together with its cultivating elements will immediately turn upside down to the position shown in Figure 2, where it will remain during transportation over the ground with the cultivating elements free therefrom; there being no necessity of again connecting the auxiliary reach until the frame is flopped back in the same manner for cultivating purposes.

Referring to the bracket or chair 18 for connection with the reach 9, it is evident that a like bracket may be used upon the opposide side of the frame 1 for connection with the reach when the harrow is in cultivating position, though by experience it is found not essential unless harrowing very rough ground.

Having thus described my invention, what I claim and desire to secure by Letters Patent, is:

1. The combination with a riding harrow of the class described, of a pivotally mounted rotatable frame carrying independently rotatable cultivating elements, said frame having runners upon one side thereof for selective engagement with the ground.

2. The combination with a riding harrow of the class described, of a pivotally mounted rotatable frame carrying independently rotatable cultivating elements, said frame having runners upon one side thereof for selective engagement with the ground, and means for rigidly holding the same when in cultivating position.

In testimony whereof I hereunto affix my signature.

OLOF H. JOHNSON